(12) United States Patent
Sugita et al.

(10) Patent No.: US 11,516,393 B2
(45) Date of Patent: Nov. 29, 2022

(54) IMAGING APPARATUS TO WHICH AN INTERCHANGEABLE LENS APPARATUS IS ATTACHED THAT UTILIZE IMAGE CIRCLE INFORMATION OF AN IMAGING OPTICAL SYSTEM IN THE INTERCHANGEABLE LENS APPARATUS

(71) Applicant: CANON KABUSHIKI KAISHA, Tokyo (JP)

(72) Inventors: Shigenobu Sugita, Shimotsuke (JP); Kenji Saitsu, Utsunomiya (JP); Masakazu Kodaira, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/236,036

(22) Filed: Apr. 21, 2021

(65) Prior Publication Data

US 2021/0243372 A1   Aug. 5, 2021

Related U.S. Application Data

(62) Division of application No. 16/180,247, filed on Nov. 5, 2018.

(30) Foreign Application Priority Data

Nov. 9, 2017 (JP) .............................. JP2017-216501
Oct. 31, 2018 (JP) .............................. JP2018-205872

(51) Int. Cl.
*H04N 5/228* (2006.01)
*H04N 5/232* (2006.01)
(Continued)

(52) U.S. Cl.
CPC ........... *H04N 5/23248* (2013.01); *G02B 7/14* (2013.01); *G03B 5/00* (2013.01); *G03B 13/22* (2013.01);
(Continued)

(58) Field of Classification Search
CPC .............................. G03B 2205/00; G02B 7/14
See application file for complete search history.

(56) References Cited

U.S. PATENT DOCUMENTS 7,505,067 B2   3/2009   Ogawa
7,783,180 B2   8/2010   Kanda
(Continued)

FOREIGN PATENT DOCUMENTS

CN   1713067 A   12/2005
CN   1892294 A   1/2007
(Continued)

OTHER PUBLICATIONS

Office Action issued in Japanese Appln. No. 2018-205872 dated Aug. 17, 2021. English translation provided.
(Continued)

*Primary Examiner* — Gary C Vieaux
(74) *Attorney, Agent, or Firm* — Rossi, Kimms & McDowell LLP

(57) ABSTRACT

An interchangeable lens apparatus attachable to an imaging apparatus configured to move an image sensor in an image stabilization includes an imaging optical system, a storage unit configured to store image circle information including a relationship between an imaging condition and position information of an image circle of the imaging optical system, and a transmission unit configured to transmit at least part of the image circle information to the imaging apparatus.

18 Claims, 13 Drawing Sheets

(51) Int. Cl.
  *G02B 7/14*   (2021.01)
  *G03B 13/22*  (2021.01)
  *G03B 5/00*   (2021.01)

(52) U.S. Cl.
  CPC ..... *H04N 5/23209* (2013.01); *H04N 5/23296* (2013.01); *G03B 2205/00* (2013.01); *G03B 2205/0015* (2013.01)

(56) References Cited

U.S. PATENT DOCUMENTS

| | | | |
|---|---|---|---|
| 9,930,259 | B2 | 3/2018 | Koyano |
| 9,973,715 | B2 | 5/2018 | Ajito |
| 10,244,157 | B2 | 3/2019 | Sugita |
| 10,244,217 | B2 | 3/2019 | Kaneda |
| 2002/0101531 | A1 | 8/2002 | Kaneda |
| 2006/0176389 | A1 | 8/2006 | Kaneda |
| 2006/0257128 | A1 | 11/2006 | Ishito |
| 2007/0003262 | A1 | 1/2007 | Shiratori |
| 2007/0097219 | A1 | 5/2007 | Nomura |
| 2007/0196084 | A1* | 8/2007 | Shibata .............. H04N 5/23287 396/55 |
| 2011/0037881 | A1 | 2/2011 | Netsume |
| 2011/0216227 | A1 | 9/2011 | Ikeda |
| 2012/0293674 | A1 | 11/2012 | Uenaka |
| 2015/0234198 | A1 | 8/2015 | Hayakawa |
| 2015/0264266 | A1 | 9/2015 | Katsuyama |
| 2015/0326780 | A1 | 11/2015 | Yoshida |
| 2016/0261806 | A1 | 9/2016 | Honjo |
| 2017/0042408 | A1 | 2/2017 | Washburn |
| 2017/0257574 | A1 | 9/2017 | Honjo |

FOREIGN PATENT DOCUMENTS

| | | | |
|---|---|---|---|
| CN | 104919367 | A | 9/2015 |
| CN | 105407265 | A | 3/2016 |
| CN | 105474623 | A | 4/2016 |
| CN | 106353949 | A | 1/2017 |
| CN | 106537248 | A | 3/2017 |
| JP | 2004040298 | A * | 2/2004 |
| JP | 2004040298 | A | 2/2004 |
| JP | 2004056581 | A | 2/2004 |
| JP | 2006019942 | A | 1/2006 |
| JP | 2007034141 | A | 2/2007 |
| JP | 2008107646 | A | 5/2008 |
| JP | 2009139877 | A | 6/2009 |
| JP | 2009265182 | A | 11/2009 |
| JP | 2015118131 | A | 6/2015 |
| JP | 2016167801 | A | 9/2016 |
| WO | 2018123639 | A1 | 7/2018 |

OTHER PUBLICATIONS

Office Action issued in Chinese Appln. No. 201811323464.0 dated Jul. 20, 2021. Partial English translation provided.

Notice of Allowance issued in U.S. Appl. No. 16/180,247 dated May 17, 2021.

Extended European Search Report issued in European Appln. No. 18204642.5 dated Mar. 21, 2019.

Office Action issued in Chinese Appln. No. 201811323464.0 dated Jul. 27, 2020. English translation provided.

Office Action issued in U.S. Appl. No. 16/180,247 dated Jan. 2, 2020.

Office Action issued in U.S. Appl. No. 16/180,247 dated Jun. 8, 2020.

Office Action issued in U.S. Appl. No. 16/180,247 dated Oct. 26, 2020.

Notice of Allowance issued in U.S. Appl. No. 16/180,247 dated Feb. 5, 2021.

Office Action issued in U.S. Appl. No. 16/180,247 dated Sep. 9, 2021.

Notice of Allowance issued in U.S. Appl. No. 16/180,247 dated Jan. 26, 2022.

* cited by examiner

| ORIENTATION | ZOOM | FOCUS | DIAPHRAGM | SHIFT_x | SHIFT_y | CIRCLE |
|---|---|---|---|---|---|---|
| NORMAL POSITION | Z1 | F1 | OPEN | x1111 | y1111 | c1111 |
| | | | TWO STAGES | x1112 | y1112 | c1112 |
| | | | MINIMUM | x1113 | y1113 | c1113 |
| | | F2 | OPEN | x1121 | y1111 | c1121 |
| | | | TWO STAGES | . | . | . |
| | | | MINIMUM | . | . | . |
| | | F3 | OPEN | . | . | . |
| | | | TWO STAGES | . | . | . |
| | | | MINIMUM | . | . | . |
| | | . | | . | . | . |
| | | . | | . | . | . |
| | | . | | . | . | . |
| | | Fn | OPEN | . | . | . |
| | | | TWO STAGES | . | . | . |
| | | | MINIMUM | . | . | . |
| | Z2 | F1 | OPEN | x1211 | y1211 | c1211 |
| | | | TWO STAGES | . | . | . |
| | | | MINIMUM | . | . | . |
| | | F2 | OPEN | . | . | . |
| | | | TWO STAGES | . | . | . |
| | | | MINIMUM | . | . | . |
| | | F3 | OPEN | . | . | . |
| | | | TWO STAGES | . | . | . |
| | | | MINIMUM | . | . | . |
| | | . | | . | . | . |
| | | . | | . | . | . |
| | | . | | . | . | . |
| | | Fn | OPEN | . | . | . |
| | | | TWO STAGES | . | . | . |
| | | | MINIMUM | . | . | . |
| | . | . | . | . | . | . |
| | . | . | . | . | . | . |
| | . | . | . | . | . | . |
| | Zm | F1 | OPEN | . | . | . |
| | | | TWO STAGES | . | . | . |
| | | | MINIMUM | . | . | . |
| | | F2 | OPEN | . | . | . |
| | | | TWO STAGES | . | . | . |
| | | | MINIMUM | . | . | . |
| | | F3 | OPEN | . | . | . |
| | | | TWO STAGES | . | . | . |
| | | | MINIMUM | . | . | . |
| | | . | | . | . | . |
| | | . | | . | . | . |
| | | . | | . | . | . |
| | | Fn | OPEN | . | . | . |
| | | | TWO STAGES | . | . | . |
| | | | MINIMUM | . | . | . |
| GRIP UP | . | . | . | . | . | . |

FIG. 6A

| ORIENTATION | ZOOM | FOCUS | DIAPHRAGM | SHIFT_x | SHIFT_y | CIRCLE |
|---|---|---|---|---|---|---|
| GRIP DOWN | ⋮ | ⋮ | ⋮ | · | · | · |
| UPWARD DIRECTION | Z1 | F1 | OPEN | x4111 | y4111 | c4111 |
| | | | TWO STAGES | x4112 | y4112 | c4112 |
| | | | MINIMUM | x4113 | y4113 | c4113 |
| | | F2 | OPEN | x4121 | y4121 | c4121 |
| | | | TWO STAGES | · | · | · |
| | | | MINIMUM | · | · | · |
| | | F3 | OPEN | · | · | · |
| | | | TWO STAGES | · | · | · |
| | | | MINIMUM | · | · | · |
| | | ⋮ | | · | · | · |
| | | | | · | · | · |
| | | | | · | · | · |
| | | Fn | OPEN | · | · | · |
| | | | TWO STAGES | · | · | · |
| | | | MINIMUM | · | · | · |
| | Z2 | F1 | OPEN | x4211 | y4211 | c4211 |
| | | | TWO STAGES | · | · | · |
| | | | MINIMUM | · | · | · |
| | | F2 | OPEN | · | · | · |
| | | | TWO STAGES | · | · | · |
| | | | MINIMUM | · | · | · |
| | | F3 | OPEN | · | · | · |
| | | | TWO STAGES | · | · | · |
| | | | MINIMUM | · | · | · |
| | | ⋮ | | · | · | · |
| | | | | · | · | · |
| | | | | · | · | · |
| | | Fn | OPEN | · | · | · |
| | | | TWO STAGES | · | · | · |
| | | | MINIMUM | · | · | · |
| | ⋮ | ⋮ | ⋮ | · | · | · |
| | | | | · | · | · |
| | | | | · | · | · |
| | | | | · | · | · |
| | Zm | F1 | OPEN | · | · | · |
| | | | TWO STAGES | · | · | · |
| | | | MINIMUM | · | · | · |
| | | F2 | OPEN | · | · | · |
| | | | TWO STAGES | · | · | · |
| | | | MINIMUM | · | · | · |
| | | F3 | OPEN | · | · | · |
| | | | TWO STAGES | · | · | · |
| | | | MINIMUM | · | · | · |
| | | ⋮ | | · | · | · |
| | | | | · | · | · |
| | | | | · | · | · |
| | | Fn | OPEN | · | · | · |
| | | | TWO STAGES | · | · | · |
| | | | MINIMUM | x4mn3 | y4mn3 | c4mn3 |

FIG. 6B

| ORIENTATION | ZOOM | DATA |
|---|---|---|
| ANGLE[0] | ZOOM[0] | x1 |
| | | y1 |
| | ZOOM[1] | x2 |
| | | y2 |
| | ZOOM[2] | x3 |
| | | y3 |
| | ⋮ | ⋮ |
| | ZOOM[xx] | xn |
| | | yn |
| ⋮ | ⋮ | ⋮ |
| ANGLE[m] | ZOOM[0] | x1 |

| ORIENTATION | DATA (x COORDINATE) | DATA (y COORDINATE) |
|---|---|---|
| ANGLE[0] | A | A |
| | B | B |
| | C | C |
| | D | D |

IMAGING APPARATUS TO WHICH AN INTERCHANGEABLE LENS APPARATUS IS ATTACHED THAT UTILIZE IMAGE CIRCLE INFORMATION OF AN IMAGING OPTICAL SYSTEM IN THE INTERCHANGEABLE LENS APPARATUS

BACKGROUND OF THE INVENTION

Field of the Invention

The present invention relates to an imaging apparatus and an interchangeable lens apparatus (referred to as an "interchangeable lens" hereinafter).

Description of the Related Art

Some imaging apparatuses, such as a digital camera and a video camera, perform image stabilization (sometimes "IS" hereinafter) to reduce an image blur by shifting an image sensor for capturing an object image relative to an optical axis in an imaging optical system. However, in an interchangeable lens type camera, an image circle diameter of a mounted interchangeable lens can be insufficient for the size of the image sensor, or the center of the image circle can shift from the center of the image sensor due to manufacturing errors of the interchangeable lens or the like. In such a case, a sufficient shift amount cannot be obtained for a good image stabilization.

Japanese Patent Laid-Open No. ("JP") 2016-167801 discloses a method of communicating information on a center position of an image circle in an interchangeable lens to a camera and of shifting a correction center of a peripheral light amount in the camera. This method can make inconspicuous the light amount drop in part on the image sensor on the shift direction side, even when the image sensor shifts in a direction opposite to the shift direction of the center position of the image circle.

JP 2009-139877 discloses a method of capturing a chart image formed by an interchangeable lens with an image sensor and of determining a shift origin position of the image sensor based on the chart image.

As disclosed in JP 2016-167801, the method of shifting the correction center of peripheral light amount is effective only when the image sensor shifts within the image circle. Thus, a sufficient shift amount of the image sensor cannot be sufficiently secured in a direction opposite to the shift direction of the center position of the image circle. For the sufficient shift amount of the image sensor, it is necessary to sufficiently make large the image circle of the interchangeable lens or to enlarge the interchangeable lens. On the other hand, when the shift origin position of the image sensor is determined after the chart image is captured, as disclosed in JP 2009-139877, it is necessary to capture the chart image whenever a new interchangeable lens is used.

SUMMARY OF THE INVENTION

The present invention provides an imaging apparatus and an interchangeable lens, each of which can secure a moving range of an image sensor in an image stabilization without enlarging an interchangeable lens even when a position of an image circle of an imaging optical system (interchangeable lens apparatus) shifts.

An interchangeable lens apparatus according to one aspect of the present invention attachable to an imaging apparatus configured to move an image sensor in an image stabilization includes an imaging optical system, a storage unit configured to store image circle information including a relationship between an imaging condition and position information of an image circle of the imaging optical system, and a transmission unit configured to transmit at least part of the image circle information to the imaging apparatus.

Further features of the present invention will become apparent from the following description of exemplary embodiments with reference to the attached drawings.

BRIEF DESCRIPTION OF THE DRAWINGS

FIGS. 6A and 6B illustrate a method of storing information on the image circle according to the first embodiment.

DESCRIPTION OF THE EMBODIMENTS

Referring now to the accompanying drawings, a description will be given of embodiments according to the present invention.

First Embodiment

Figure 5:
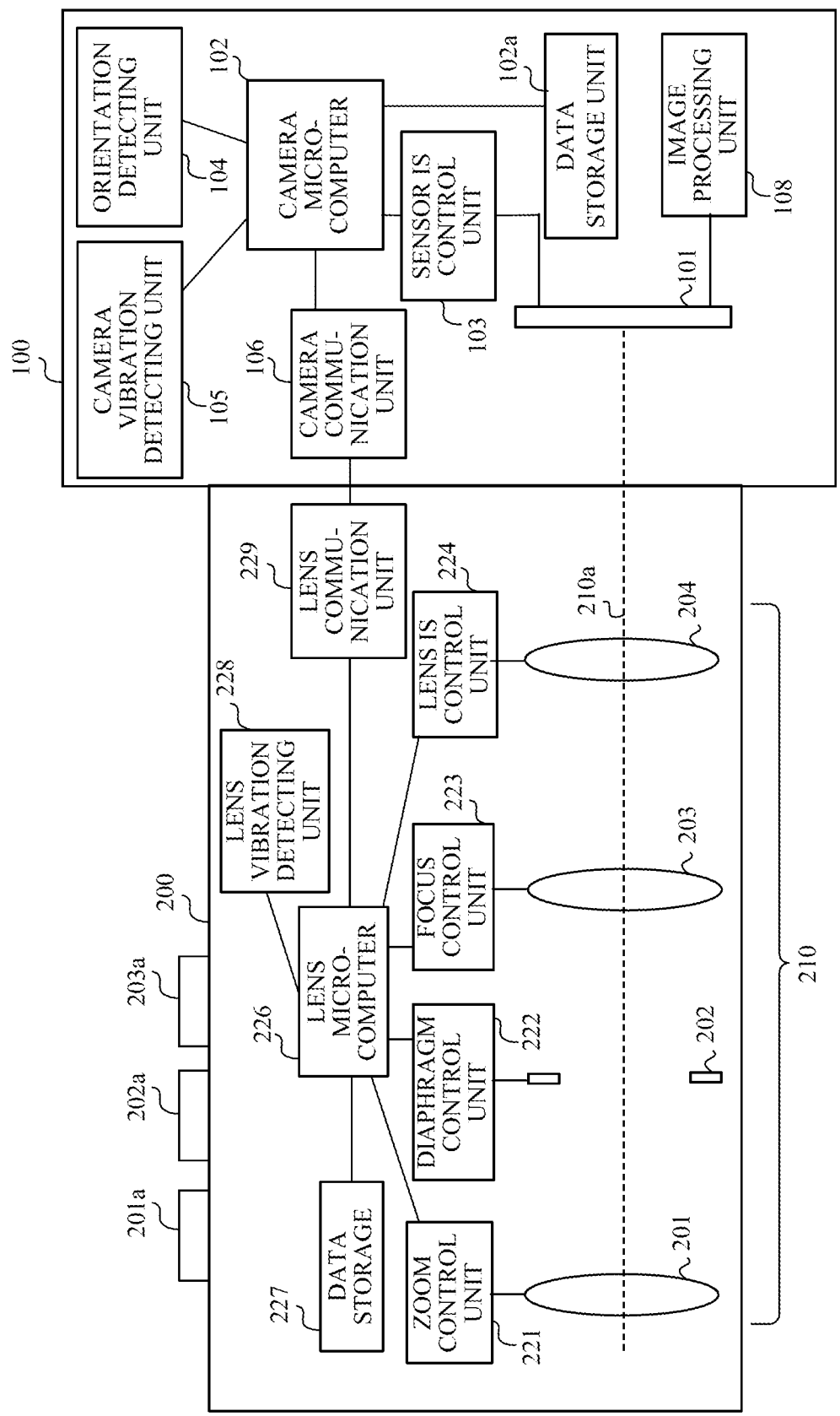
FIG. 5 is a block diagram of configurations of the imaging apparatus and the interchangeable lens according to the first embodiment.

FIG. 5 illustrates a configuration of a camera system including an imaging apparatus (referred to as a "camera" hereinafter) 100 and an interchangeable lens apparatus (referred to as an "interchangeable lens" hereinafter) 200 attachable to and detachable from the camera 100 according to a first embodiment. The camera 100 may be a still camera or a video camera.

In the camera 100, an image sensor 101 captures (photoelectrically converts) an object image formed by an imaging optical system 210 in the interchangeable lens 200. An output signal (image signal) from the image sensor 101 is input to an image processing unit 108. The image processing unit 108 performs various image processing for the image signal to generate image data. The image data is displayed on an unillustrated monitor or recorded on an unillustrated recording medium.

The image sensor 101 can move in a direction within a plane intersecting an optical axis 210a in the imaging optical system 210 by an unillustrated shift mechanism. For example, the image sensor 101 can shift within the plane orthogonal to the optical axis 210a or rotate in the plane orthogonal to the optical axis 210a with the optical axis 210a as the rotation center. The following description mainly discusses shifting the image sensor 101.

The camera vibration detecting unit 105 detects a vibration of the camera 100 (referred to as a "camera vibration" hereinafter) caused by a hand shake of the user or the like. The camera vibration detecting unit 105 includes at least one of an acceleration sensor and an angular velocity sensor, and outputs a detection signal indicating the vibration amount of the camera 100 to a camera microcomputer 102.

The camera microcomputer 102 serves as a control unit configured to control the movement of the image sensor 101. The camera microcomputer 102 calculates the shift amount of the image sensor 101 so as to reduce (correct) the image blur caused by camera shake based on the detection signal from the camera vibration detecting unit 105, and outputs an image stabilization instruction including the shift amount to a sensor IS control unit 103. The sensor IS control unit 103 shifts the image sensor 101 by the shift amount calculated by the camera microcomputer 102 by controlling the actuator included in the shift mechanism in accordance with the image stabilization instruction from the camera microcomputer 102. Thereby, image stabilization (image blur correction) is performed.

The camera microcomputer (control unit) 102 can communicate with the lens microcomputer 226 via a camera communication unit 106 and a lens communication unit 229 in the interchangeable lens 200.

An orientation detecting unit 104 detects an orientation of the camera 100 (referred to as a "camera orientation" hereinafter), and outputs a detection signal indicating the camera orientation to the camera microcomputer 102. The camera orientation includes a normal position, a grip-up vertical position, a grip-down vertical position, an upward orientation, and the like. The imaging optical system 210 in the interchangeable lens 200 includes a magnification varying lens (zoom lens) 201, a diaphragm (aperture stop) 202, a focus lens 203, and an image stabilization lens (optical element) 204. A zoom control unit 221 can detect the position of the zoom lens 201 (referred to as a "zoom position" hereinafter), and performs zooming by driving the zoom lens 201 in accordance with a zoom drive command from the camera microcomputer 102. A focus control unit 223 can detect the position of the focus lens 203 (referred to as a "focus position" hereinafter), and performs focusing by driving the focus lens 203 in accordance with a focus drive command from the camera microcomputer 102. The magnification varying lens 201 is one representative lens of the lenses which move in zooming, and the focus lens 203 is one representative lens of the lenses which move in focusing.

A diaphragm control unit 222 can detect an aperture diameter (referred to as a "diaphragm position" hereinafter) of the diaphragm 202, and adjusts the light amount by driving the diaphragm 202 in accordance with the diaphragm drive command from the camera microcomputer 102. The diaphragm control unit 222 may continuously detect and control the diaphragm position or discontinuously detect and control the diaphragm position such as an open state, two stages (middle), and one stage (minimum). The diaphragm position may be detected by using the drive amount of the drive mechanism that drives the diaphragm 202.

The zoom position, the diaphragm position, and the focus position detected by the zoom control unit 221, the diaphragm control unit 222, and the focus control unit 223 are sent to the camera microcomputer 102. The zoom position transmitted by the zoom control unit 221 to the camera microcomputer 102 may be information on the position of the variator lens 202 or on the focal length corresponding to the zoom position.

The image stabilization lens 204 can be shifted in a direction including a direction component orthogonal to the optical axis 210a by the unillustrated shift mechanism in the image stabilization. In other words, this configuration can shift within a plane orthogonal to the optical axis 210a or rotate around a point on the optical axis 210a as the center of rotation. The following description mainly discusses the image stabilization lens 204 shifted in a plane orthogonal to the optical axis 210a.

The lens vibration detecting unit 228 detects a vibration (referred to as a "lens vibration" hereinafter) of the interchangeable lens 200 caused by a hand shake of the user, and outputs a detection signal representing the lens vibration to the lens microcomputer 226.

Using the detection signal from the lens vibration detecting unit 228, the lens microcomputer 226 calculates the shift amount of the image stabilization lens 204 for reducing (correcting) the image blur caused by the lens vibration and outputs the image stabilization instruction containing the shift amount to the lens IS control unit (control unit) 224. The lens IS control unit (lens IS unit) 224 controls the movement of the image stabilization lens 204. More specifically, the image stabilization lens 204 is driven by the calculated shift amount by controlling the actuator included in the shift mechanism in accordance with the image stabilization instruction from the lens microcomputer 226. Thereby, the lens IS is performed. In the following description, a shiftable range of the image stabilization lens 204 is referred to as a lens shiftable range.

The lens microcomputer 226 serves as a transmission unit that reads information, such as image circle information, stored in the data storage unit (storage unit) 227 and transmits image circle information and the like to the imaging apparatus 100.

The data storage unit 227 stores optical information, such as a zoom range (a variable range of the focal length) of the imaging optical system 210, a focus range (a focusable distance range), and a variable range of the F-number. In addition, the data storage unit 227 stores information on the image circle of the imaging optical system 210 (referred to as "image circle information" hereinafter). In this embodiment, the image circle information contains position information of the image circle and information on the size of the image circle. The position information of the image circle in this embodiment contains the image circle center information on the center position of the image circle.

Each of the zoom ring 201a, the diaphragm ring 202a, and the focus ring 203a is a ring-shaped operation member that can be operated by a user. The camera microcomputer 102 determines a zoom drive command, a focus drive command, and a diaphragm drive command according to the operation amount of each of the zoom ring 201a, the diaphragm ring 202a, and the focus ring 203a. FIG. 5 illustrates the interchangeable lens 200 including the zoom ring 201a, the diaphragm ring 202a, and the focus ring 203a, but the camera 100 may include these operation members.

Figure 1:
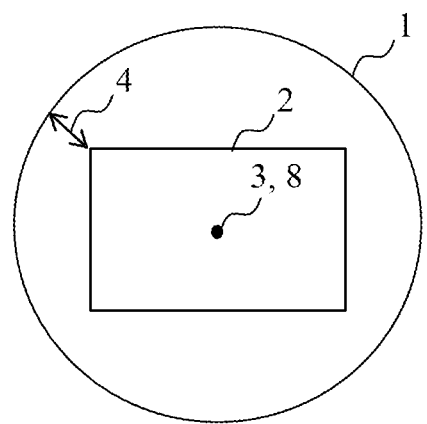
FIG. 1 illustrates a shiftable amount of an image sensor when the center of an image circle of an interchangeable lens does not shift from the center of an image sensor.

FIG. 1 illustrates a shiftable amount 4 of the image sensor 2 in an ideal case where the center 3 of the image circle 1 of the imaging optical system 210 coincides with the center 8 of the image sensor 2 (101) as viewed from the extending direction of the optical axis 210a (viewed from the optical axis direction). In this case, even if the image sensor 2 shifts in any diagonal directions, the shiftable amount 4 becomes maximum. In other words, the sensor shiftable range, in which the image sensor 2 can move, is maximized.

Figure 2:
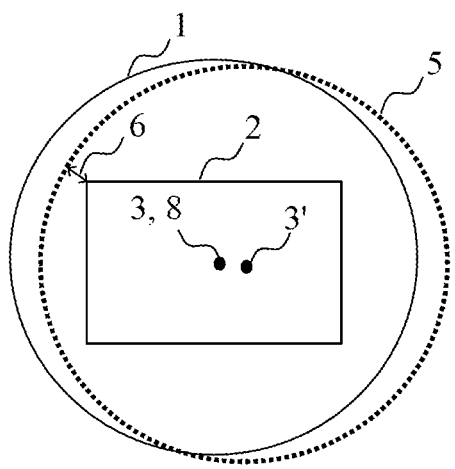
FIG. 2 illustrates the shiftable amount of the image sensor when the center of the image circle of the interchangeable lens shifts from the center of the image sensor.

FIG. 2 illustrates (the center 3' of) the image circle 5 shifts to the lower right side from (the center 8 of) the image sensor 2 with respect to the ideal image circle 1 illustrated in FIG. 1 due to manufacturing errors of the interchangeable lens. In this state, in shifting the image sensor 2 to the upper left direction or the lower left direction, the shiftable amount 6 is reduced in comparison with the state in FIG. 1. In the state of FIG. 2, when the image sensor 2 is shifted by the same shift amount as the shiftable amount 4 illustrated in FIG. 1 in the upper or lower left direction, the upper or lower left part of the image sensor 2 becomes located outside the image circle. Thereby, the upper or lower left corner in the image formed by the image signal becomes black, and the image quality is degraded.

Figure 3:
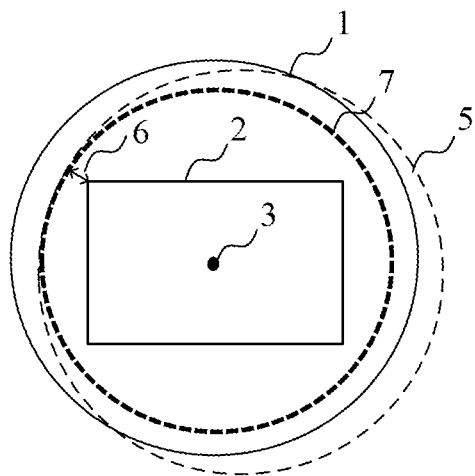
FIG. 3 illustrates a permissible shiftable range of the image sensor in case of FIG. 2.

The manufacturing error of the interchangeable lens arises due to the decentering of the optical element in the imaging optical system 210 from the optical axis 210a and therefore can occur in any directions depending on the decentering direction of each interchangeable lens. Thus, in order to prevent the image sensor 2 from deviating from the image circle regardless of whichever interchangeable lens is mounted, as illustrated in FIG. 3, it is necessary to define an effective image circle 7 that does not protrude from the image circle 5 shifted due to the manufacturing errors in the original image circle 1. In other words, it is necessary to set an inside range of the effective image circle 7 to a sensor shiftable range. However, in this case, the shiftable amount of the image sensor 2 decreases in any directions, so that sufficient sensor IS cannot be performed.

Increasing the image circle 1 in the design stage in order to enlarge the effective image circle 7 undesirably causes the interchangeable lens as a whole to become larger. Hence, the interchangeable lens according to this embodiment previously stores, memorizes, or prepares for the image circle information in the data storage unit 227. The image circle information is obtained, for example, by a measurement for each individual of the interchangeable lens in manufacturing the interchangeable lens. For example, the shift amount and the shift direction of the center position (3') of the actual image circle 5 from the center position (3) of the original image circle 1 illustrated in FIG. 2 are measured with individual interchangeable lenses. Then, vector information representing the shift amount and the shift direction obtained by the measurement is stored or memorized (prepared) in the data storage unit 227 as image circle center information on the center position of the actual image circle 5. The lens microcomputer 226 transmits the image circle information to the camera microcomputer 102.

Figure 4:
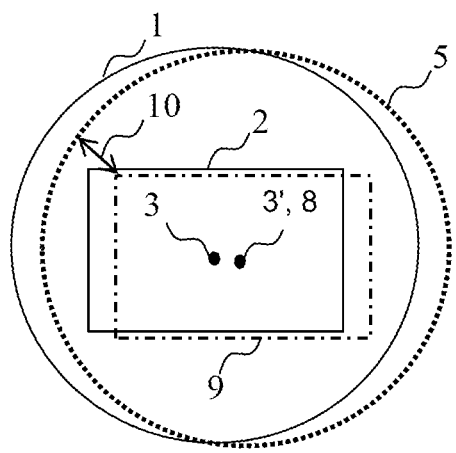
FIG. 4 illustrates the shiftable range of the image sensor set when the center of the image circle of the interchangeable lens shifts from the center of the image sensor according to a first embodiment.

The camera microcomputer 102 sets the sensor shiftable range by using the image circle information received from the lens microcomputer 226. In other words, as illustrated in FIG. 4, the camera microcomputer 102 uses the received image circle center information to set the initial shift position (referred to as a "initial sensor shift position" hereinafter) 9 of the image sensor 2 as the movement origin in the image stabilization. Then, the camera microcomputer 102 sets the initial sensor shift position 9 so that the center 8' of the image sensor 2 can be (or close to) the center 3' of the actual image circle 5 when viewed from the direction of the optical axis 210a. By making the initial sensor shift position 9 coincide with the center 3' and by shifting the image sensor 2 from the set initial sensor shift position 9, the shiftable amount 10 can be secured in the image stabilization control as in the ideal state illustrated in FIG. 1.

The lens microcomputer 226 also stores image circle size information on the size (diameter) of the image circle as the image circle information in the data storage unit 227, and also transmits the image circle size information to the camera microcomputer 102. The camera microcomputer 102 according to this embodiment also uses the image circle size information to set a shiftable amount that can shift the image sensor 2 to the maximum from the set initial position 9.

FIGS. 6A and 6B illustrate image circle center information and image circle size information stored in the data storage unit 227. This embodiment stores the image circle center information as vector information or two-dimensional coordinate (shift_x, shift_y) in the data storage unit 227, and the image circle size information as a scalar amount (circle).

In this embodiment, the center 8' and the size of the image circle 5 change according to the zoom position, the focus position, and the diaphragm position (open, two stages (middle), one stage (minimum)) as the optical state of the imaging optical system 210. The center 8' and size of the image circle 5 change according to the camera orientation (normal position, grip-up vertical position, grip-down vertical position, and the upward orientation). Therefore, the data storage unit 227 stores different information as the image circle center information and the image circle size information according to the imaging condition, such as the optical state of the imaging optical system 210 and the camera orientation.

Thus, this embodiment sends to the camera microcomputer 102 image circle information that is different according to the optical state of the imaging optical system 210 and the camera orientation. Then, the camera microcomputer 102 sets the sensor shiftable range by using the image circle information corresponding to the actual optical state and the camera orientation. Thereby, the maximum sensor shiftable range can be set according to the use state of the camera system.

Figure 7:
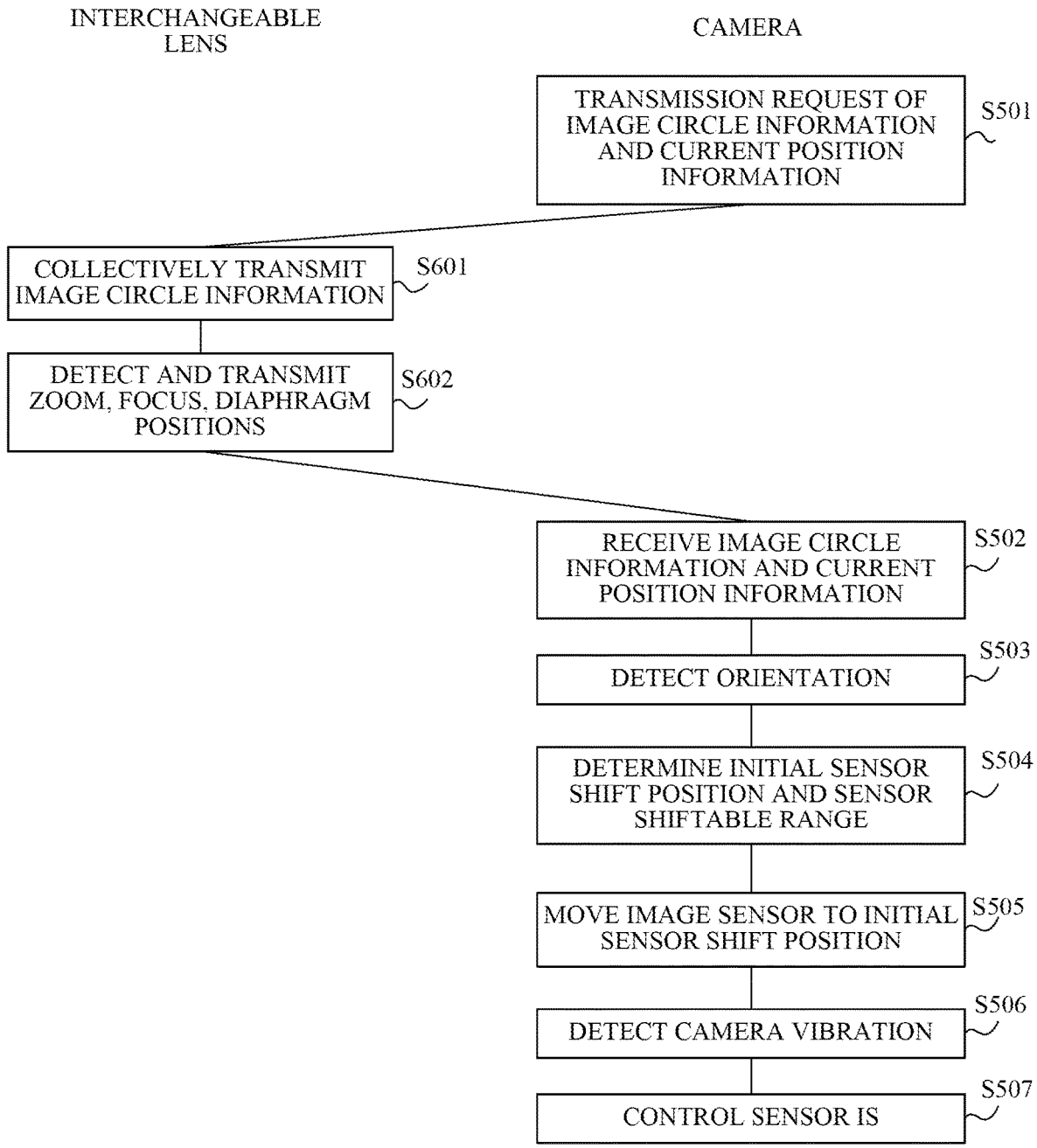
FIG. 7 is a flowchart of processing performed according to the first embodiment.

Referring now to FIG. 7, a description will be given of processing performed by the camera microcomputer 102 and the lens microcomputer 226 according to this embodiment. The camera microcomputer 102 and the lens microcomputer 226 read a control program as a computer program, and execute this processing according to the control program. The control program executed by the camera microcomputer 102 is stored in the data storage unit 102a (illustrated in FIG. 5), and the control program executed by the lens microcomputer 226 is stored in the data storage unit 227. This also applies to other embodiments described later.

In FIG. 7, the steps S501 to S506 are executed by the camera microcomputer 102, and the steps S601 to S602 are executed by the lens microcomputer 226.

In the step S501, the camera microcomputer 102 requires the lens microcomputer 226 to transmit the image circle information (image circle center information and image circle size information), and current position information that contains information on a current zoom position, a current focus position, and a current diaphragm position.

In the step S601, the lens microcomputer 226 transmits all the image circle information read out of the data storage unit 227 in a lump (batch) to the camera microcomputer 102 in response to this transmission request.

Subsequently, in the step S602, the lens microcomputer 226 transmits the current position information containing the current zoom position, the current focus position, and the current diaphragm position detected by the zoom control unit 221, the focus control unit 223, and the diaphragm control unit 222 to the microcomputer 102.

In the step S502, the camera microcomputer 102 receives all image circle information transmitted from the lens microcomputer 226, and stores it in the data storage unit 102a. In the step S503, the camera microcomputer 102 receives the current position information transmitted from the lens microcomputer 226.

Next, in the step S503, the camera microcomputer 102 detects the current camera orientation through the orientation detecting unit 104.

In the step S504, the camera microcomputer 102 reads from the data storage unit 102a the image circle information out of all the image circle information which corresponds to the current zoom position, the current focus position, the current diaphragm position, and the current camera orientation. When the image circle information corresponding to the current zoom position, the current focus position, the current diaphragm position, and the current camera orientation is not saved in the data storage unit 102a, necessary image circle information may be acquired by the interpolation by using the stored image circle information. In this step, the camera microcomputer 102 determines (sets) the sensor shiftable range as illustrated in FIG. 4 by using the read image circle information (image circle center information and image circle size information). In other words, the initial sensor shift position is set based on the image circle center information, and the shiftable amount of the image sensor 101 is set based on the image circle size information.

The above interpolation may be calculated based on a predetermined approximate function indicating a relationship among each of the current zoom position, the current focus position, the current diaphragm position, the current camera orientation, and the center position of the image circle. Alternatively, the interpolation may be calculated based on a predetermined approximate function, such as a linear function, indicating the rotation angles of various rotation rings and the center position of the image circle. The rotary ring in this case is at least one of the zoom ring 201a, the diaphragm ring 202a, and the focus ring 203a in this embodiment. This embodiment discusses interpolating the center position of the image circle as the image circle information, but may similarly interpolate the diameter of the image circle.

In the step S505, the camera microcomputer 102 moves the image sensor 101 to the initial sensor shift position determined in the step S504. Thereby, when viewed from the optical axis direction, the center position of the image sensor 101 overlaps the center position of the image circle.

In the steps S506 and S507, sensor IS control is performed based on the instruction from the camera microcomputer 102. In other words, when camera vibration is detected through the camera vibration detecting unit 105 in the step S506, the image sensor 101 is shifted in the step S507 and driven through the sensor IS control unit 103 so as to reduce the image blur caused by the detected camera vibration.

As described above, the lens microcomputer 226 stores the relationship between the imaging condition, such as the zoom position in the imaging optical system 210, the focus position in the imaging optical system 210, the diaphragm position in the imaging optical system 210, and the orientation of the camera 100, and the center position of the image circle. The image sensor 101 is moved to the initial sensor shift position 9 of the image sensor 101 determined by the camera microcomputer 102 based on the information. Thereby, this embodiment can secure the shiftable amount of the image sensor 101 in the image stabilization without increasing the size of the interchangeable lens 200, even when the image circle center of the interchangeable lens 200 shifts.

The steps S501 to S502 and steps S601 to S602 are transmitted and received, for example, in the initial communication performed when the interchangeable lens is attached to the camera 100. The lens microcomputer 226 may detect the lens orientation by the orientation detecting unit provided in the interchangeable lens 200 instead of the orientation detecting unit 104 provided in the camera 100. The lens microcomputer 226 may perform the processing of the step S602 before the step S601.

Second Embodiment

Referring now to a flowchart of FIG. 8, a description will be given of processing performed by the camera microcomputer 102 and the lens microcomputer 226 according to a second embodiment. The configurations of the camera 100 and the interchangeable lens 200 according to the second embodiment are the same as those of the first embodiment.

In the first embodiment, the camera microcomputer 102 receives all image circle information in a lump from the lens microcomputer 226, and the camera microcomputer 102 obtains the image circle information corresponding to the current zoom position, the current focus position, the current diaphragm position, and the current camera orientation. On the other hand, in this embodiment, the camera microcomputer 102 acquires image circle information corresponding to the current zoom position, the current focus position, the current diaphragm position, and the current camera orientation from the lens microcomputer 226.

Figure 8:
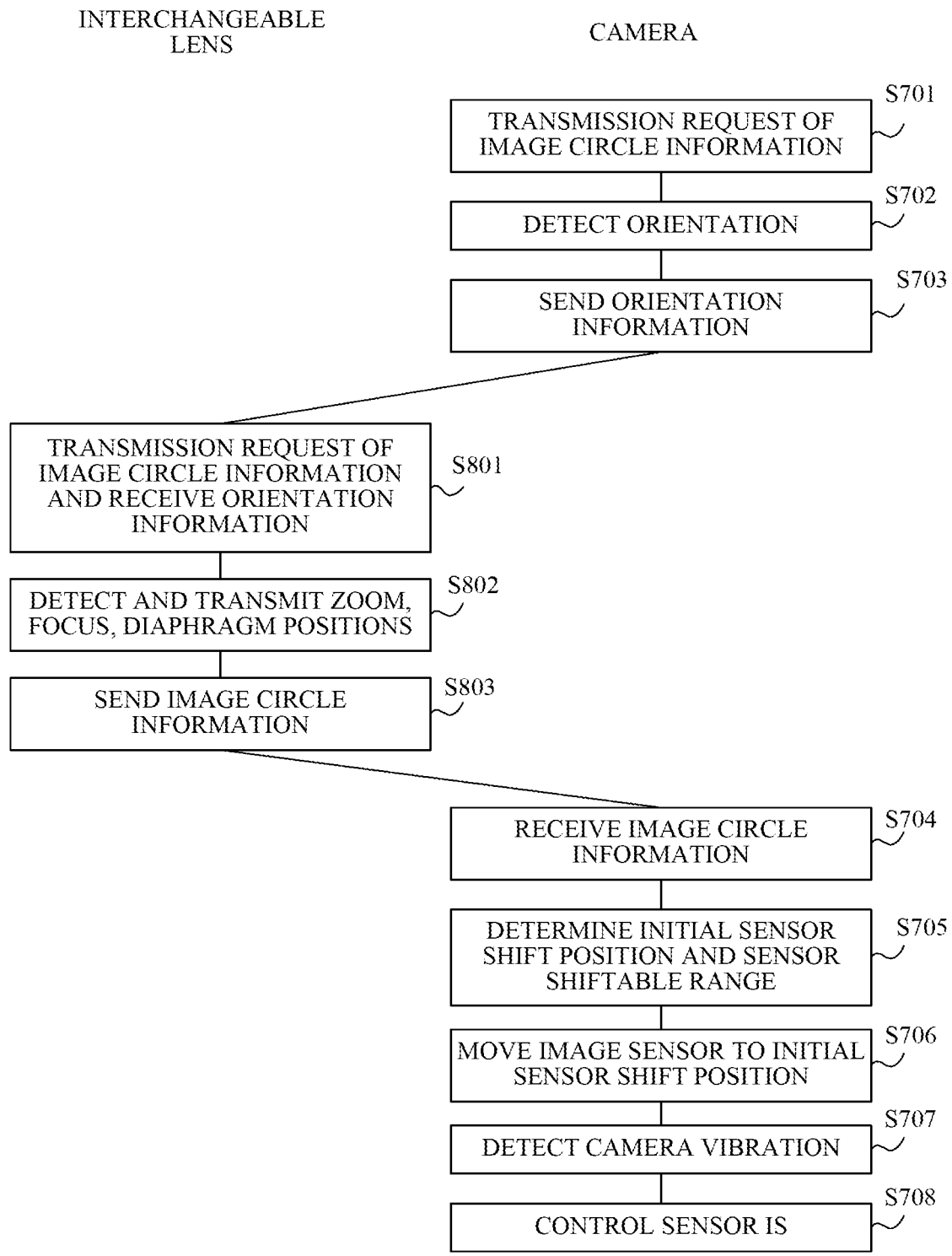
FIG. 8 is a flowchart of processing performed according to a second embodiment.

FIG. 8 illustrates the steps S701 to S708 executed by the camera microcomputer 102, and the steps S801 to S803 executed by the lens microcomputer 226.

In the step S701, the camera microcomputer 102 requests the lens microcomputer 226 to transmit image circle information (image circle center information and image circle size information).

Next, in the step 702, the camera microcomputer 102 detects the camera orientation through the orientation detecting unit 104. In the step S703, the camera microcomputer 102 transmits information on the detected camera orientation to the lens microcomputer 226.

In the step S801, the lens microcomputer 226 receives a transmission request of the image circle information from the camera microcomputer 102 and information on the camera orientation.

Next, in the step S802, the lens microcomputer 226 acquires the current zoom position, the current focus position, and the current diaphragm position detected by the zoom control unit 221, the focus control unit 223, and the diaphragm control unit 222, respectively.

Next, in the step S803, the lens microcomputer 226 reads the image circle information corresponding to the current zoom position, the current focus position, the current diaphragm position, and the current camera orientation from the data storage unit 227, and transmits them to the camera microcomputer 102. When the image circle information corresponding to the current zoom position, the current focus position, the current diaphragm position, and the current camera orientation is not stored in the data storage unit 227, the lens microcomputer 226 may obtain necessary image circle information through the interpolation or the like by using stored image circle information. The interpolation calculation method is the same as that described above.

In the step S704, the camera microcomputer 102 receives the image circle information corresponding to the current zoom position, the focus position, the diaphragm position and the detected camera orientation transmitted from the lens microcomputer 226.

Thereafter, in the steps S705 to S708, the camera microcomputer 102 performs the sensor IS control so as to determine the sensor shiftable range similar to the steps S504 to S507 of the first embodiment (FIG. 7), to determine the sensor shiftable range, and to reduce an image blur caused by the camera vibration.

According to this embodiment, the camera microcomputer 102 receives only the image circle information for the sensor IS control according to the latest imaging condition from the lens microcomputer 226. In addition to the same effect as in the first embodiment, this embodiment can make smaller a necessary capacity of the data storage unit 102a than that where all image circle information is received and stored in the data storage unit 102a as in the first embodiment.

The lens microcomputer 226 may detect the lens orientation by the orientation detecting unit provided in the interchangeable lens 200 instead of the orientation detecting unit 104 provided in the camera 100. Then, the image circle information corresponding to the current zoom position, focus position, diaphragm position, and detected lens orientation may be transmitted to the camera microcomputer 102.

The camera microcomputer 102 may perform the step S701 in parallel with the steps S702 and S703 or after the steps S702 and S703 and before the step S801. The lens microcomputer 226 may perform the step S802 prior to the step S801.

When the camera microcomputer 102 and the lens microcomputer 226 periodically communicate with each other in accordance with the vertical synchronization signal, the lens microcomputer 226 generates image circle information corresponding to the imaging condition, such as the latest zoom position, for each vertical synchronization signal.

Third Embodiment

Figure 9:
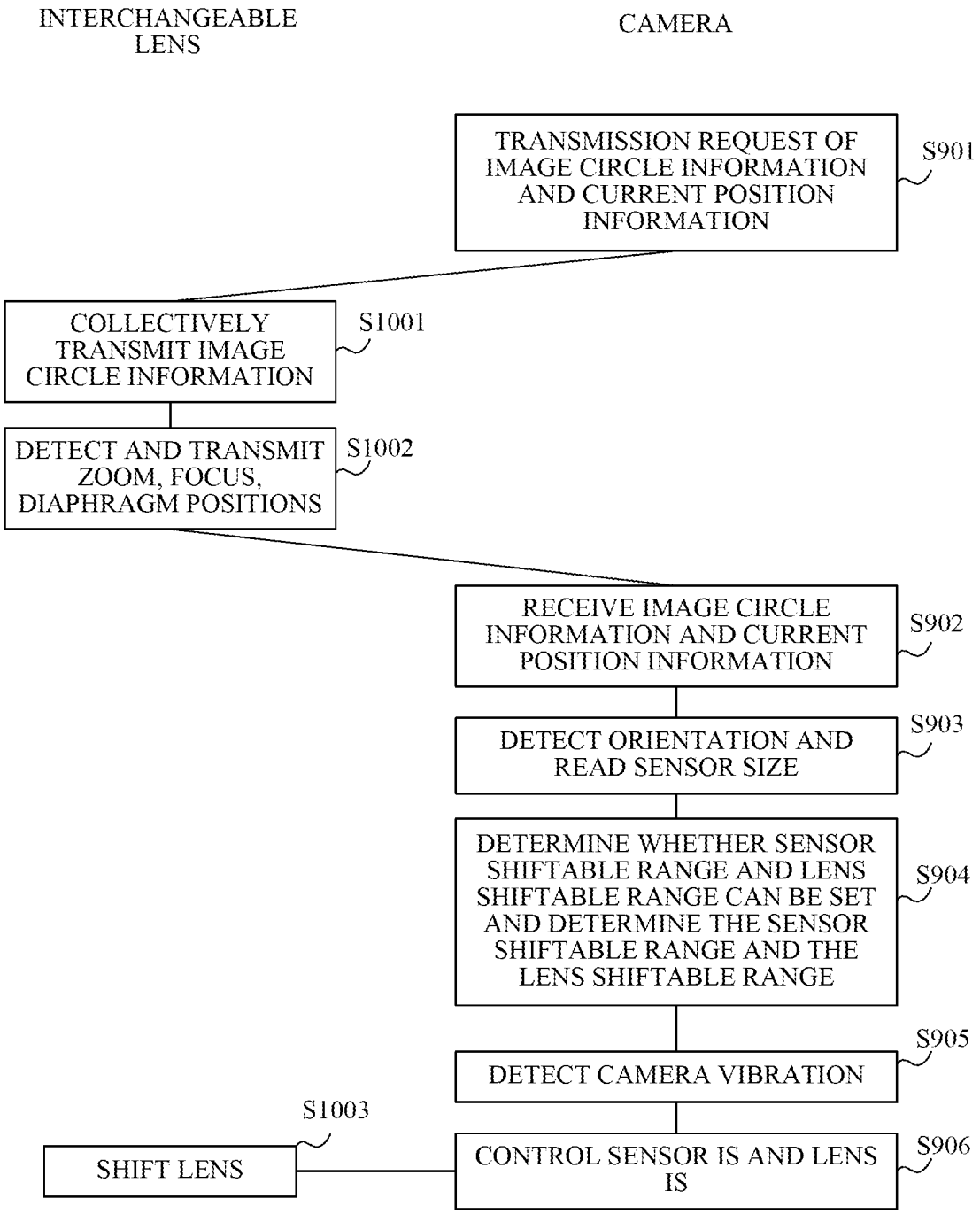
FIG. 9 is a flowchart of processing performed according to a third embodiment.

Referring now to FIG. 9, a description will be given of processing performed by the camera microcomputer 102 and the lens microcomputer 226 according to a third embodiment. The configurations of the camera 100 and the interchangeable lens 200 of the third embodiment are the same as those of the first embodiment.

In FIG. 9, in the step S701, the camera microcomputer 102 transmits information on all image circle information (image circle center information and image circle size information) and information on the current zoom position, the current focus position, and the current diaphragm position to the lens microcomputer 226.

In the step S1001, the lens microcomputer 226 transmits all image circle information read from the data storage unit 227 in a lump to the camera microcomputer 102 in accordance with the transmission request. Next, in the step S1002, the lens microcomputer 226 transmits to the camera microcomputer 102 information on the current zoom position, the current focus position, and the current diaphragm position detected by each of the zoom control unit 221, the focus control unit 223, and the diaphragm control unit 222.

In the step S902, the camera microcomputer 102 receives all the image circle information and stores it in the data storage unit 102a. The camera microcomputer 102 also receives information on the current zoom position, the current focus position, and the current diaphragm position transmitted from the lens microcomputer 226.

In the step S903, the camera microcomputer 102 detects the camera orientation through the orientation detecting unit 104. In addition, the camera microcomputer 102 reads out of the data storage unit 102a information on the size (for example, a diagonal size) of the image sensor 101 which has been previously stored in the data storage unit 102a.

In the step S904, the camera microcomputer 102 reads from the data storage unit 102a the image circle information corresponding to the current zoom position, the current focus position, and the current diaphragm position and the detected camera orientation among all the image circle information. Similar to the first embodiment, the image circle information corresponding to the current zoom position, the current focus position, and the current diaphragm position, and the detected camera orientation may be obtained by the interpolation or the like. The interpolation calculation method is as described above. Furthermore, the camera microcomputer 102 determines (selects) whether it is necessary to set the sensor shiftable range and the lens shiftable range according to the shift of the image circle by using the read image circle information and the information on the size of the image sensor 101. If the setting is necessary according to the determination result, the camera microcomputer 102 determines the sensor shiftable range and the lens shiftable range by using the image circle information and the information on the zoom position (focal length) acquired in the step S902.

More specifically, a relationship between the shift amount ΔY of the image sensor 101 and the IS angle (camera vibration angle correctable by the image stabilization) Δθ obtained by the shift amount ΔY is expressed as follows:

$$\Delta Y = f \tan \Delta\theta$$

In other words, the IS sensitivity changes according to the focal length. Hence, when the imaging optical system 210 is a telephoto type (or the focal length f is long), the IS angle Δθ does not increase much even when the image sensor 101 is shifted. In such a case, the main IS is performed by shifting the image stabilization lens 204, and the lens shiftable range and the sensor shiftable range are determined so as to correct the shift of the image circle by the shift of the image sensor 101. On the other hand, when the imaging optical system 210 is a wide-angle system (the focal length f is short), a large IS angle Δθ can be obtained by shifting the image sensor 101. In such a case, the main IS is carried out by shifting the image sensor 101, and the sensor shiftable range and the lens shiftable range are determined so as to correct the shift of the image circle by shifting the image stabilization lens 204. That is, one of the image sensor 101 and the image stabilization lens 204 performs the main IS and the other corrects the shift of the image circle so as to perform a good image stabilization as a whole so as to allot the sensor shiftable range and the lens shiftable range. Correcting the shifted image circle means reducing the shift amount between the origin position of the image circle and the origin position of the image sensor 101.

Thus, in correcting the position of the image on the image sensor 101 by a predetermined amount (or in the IS control), in accordance with the focal length of the imaging optical system 210, a movement allotment ratio between the image stabilization lens 204 and the image sensor 101 is made different so as to correct the image circle shift. More specifically, when the imaging optical system 210 has a focal length of a first length, the shift amount (allotment ratio of the image sensor 101) of the initial sensor shift position is made longer than that where the focal length is a second length shorter than the first length. On the contrary, when the imaging optical system 210 has the focal length of the first length, the shift amount (allotment ratio of the image stabilization lens 204) of the lens shift initial position is made smaller than that where the focal length is the second length shorter than the first length.

Similarly, in correcting the position of the image on the image sensor 101 by a predetermined amount (IS correction angle) based on the focal length of the imaging optical system 210, the allotment ratio of the IS angle θ (IS correction angle) between the image stabilization lens 204 and the image sensor 101 is made different. More specifically, when the imaging optical system 210 has the focal length of the first length, the shift amount of the image sensor 101 is made smaller than that where the focal length is the second length shorter than the first length (or the allotment ratio of the IS correction angle of the image stabilization lens 204 is made larger). On the contrary, when the imaging optical system 210 has the focal length of the first length, the shift amount of the image stabilization lens 204 is made larger than that where the focal length is the second length shorter than the first length (or the allotment ratio of the IS correction angle of the image stabilization lens 204 is made larger).

Depending on the focal length, one of the image sensor 101 and the image stabilization lens 204 may be used only to correct the shift of the image circle, and the other may be used for the IS control.

When the imaging optical system 210 is a zoom lens, the allotment ratio of the correction of the image circle shift and the allotment ratio of the IS correction angle may be continuously changed according to the change of the focal length. This configuration can prevent the image position on the image sensor 101 from discontinuously changing. This embodiment cooperatively controls the image sensor 101 and the image stabilization lens 204. One of the lens microcomputer 226 and the camera microcomputer 102 may determine the allotment ratio of the correction of the image circle shift and the allotment ratio of the IS correction angle, and may transmit the determination content to the other. Both the lens microcomputer 226 and the camera microcomputer 102 may determine them based on the same program.

Hence, the camera microcomputer 102 that has determined the initial sensor shift position, the sensor shiftable range, and the lens shiftable range, detects the camera vibration through the camera vibration detecting unit 105 in the step S905.

In the step S906, the camera microcomputer 102 shifts the image sensor 101 through the sensor IS control unit 103 within the set sensor shiftable range according to the detected camera vibration. The camera microcomputer 102 calculates the lens shift amount in the set lens shiftable range in accordance with the detected camera vibration, and transmits the result and the lens IS instruction to the lens microcomputer 226. Upon receiving this lens IS instruction, the lens microcomputer 226 shifts the image stabilization lens 204 by the lens shift amount included in the lens IS instruction at the step S1003.

This embodiment can provide the good image stabilization, even when the center of the image circle of the interchangeable lens 200 shifts from the designed value by using the shift of the image sensor 101 and the shift of the image stabilization lens 204.

If the interchangeable lens 200 is not a zoom lens, the camera microcomputer 102 may request the lens microcomputer 226 to transmit information on the focal length of the imaging optical system 210 instead of the current zoom position, and acquire the information. The focal length information may be acquired before the step S904. In addition, the information representing the focal length is not necessarily information on the focal length, but may be individual information (ID information) capable of specifying the interchangeable lens 200. The lens microcomputer 226 may transmit the individual number to the camera microcomputer 102 and the camera microcomputer 102 may acquire the focal length corresponding to the acquired individual information from the database stored in the data storage unit 102a.

This embodiment has described the interchangeable lens 200 including the image stabilization lens 204. If it is unknown whether the interchangeable lens 200 includes the image stabilization lens 204 or whether the interchangeable lens 200 has the lens IS function, the camera 100 may inquire, through communications, the interchangeable lens 200 of whether the interchangeable lens 200 has the lens IS function. The communication is, for example, the initial communication performed when the interchangeable lens 200 is attached to the camera 100. When it is notified that the interchangeable lens 200 has the lens IS function as a result of inquiring as to whether it has the lens IS function, the camera microcomputer 102 executes processing according to the flowchart of FIG. 9. If there is no response from the interchangeable lens 200 for a predetermined time or when it is notified from the interchangeable lens 200 that it has no lens IS function as a result of inquiring as to whether it has the lens IS function, the camera microcomputer 102 controls the image stabilization by using only the image sensor 101 as in the first and second embodiments.

Fourth Embodiment

Next follows a description of a fourth embodiment. The configurations of the camera 100 and the interchangeable lens 200 according to the fourth embodiment are the same as those of the first embodiment.

The first to third embodiments set a sensor shiftable range by using the image circle information. However, the sensor shiftable amount of the image sensor 101 is limited by the mechanical constraints, the constraints due to electric power for shifting the image sensor 101, the constraints caused by the influence of the magnetic noise generated by shifting the image sensor 101, and the like. Hence, the sensor shiftable range may not be set simply by using only the image circle information. Then, the shift of the center position of the image circle can be corrected by shifting the initial shift position (referred to as a "lens shift center" in this embodiment hereinafter) of the image stabilization lens 204 of the interchangeable lens 200. This configuration can optimize the IS control of each of the camera 100 and the interchangeable lens 200 while the optical performance of the camera system is improved as a whole.

Figure 10:
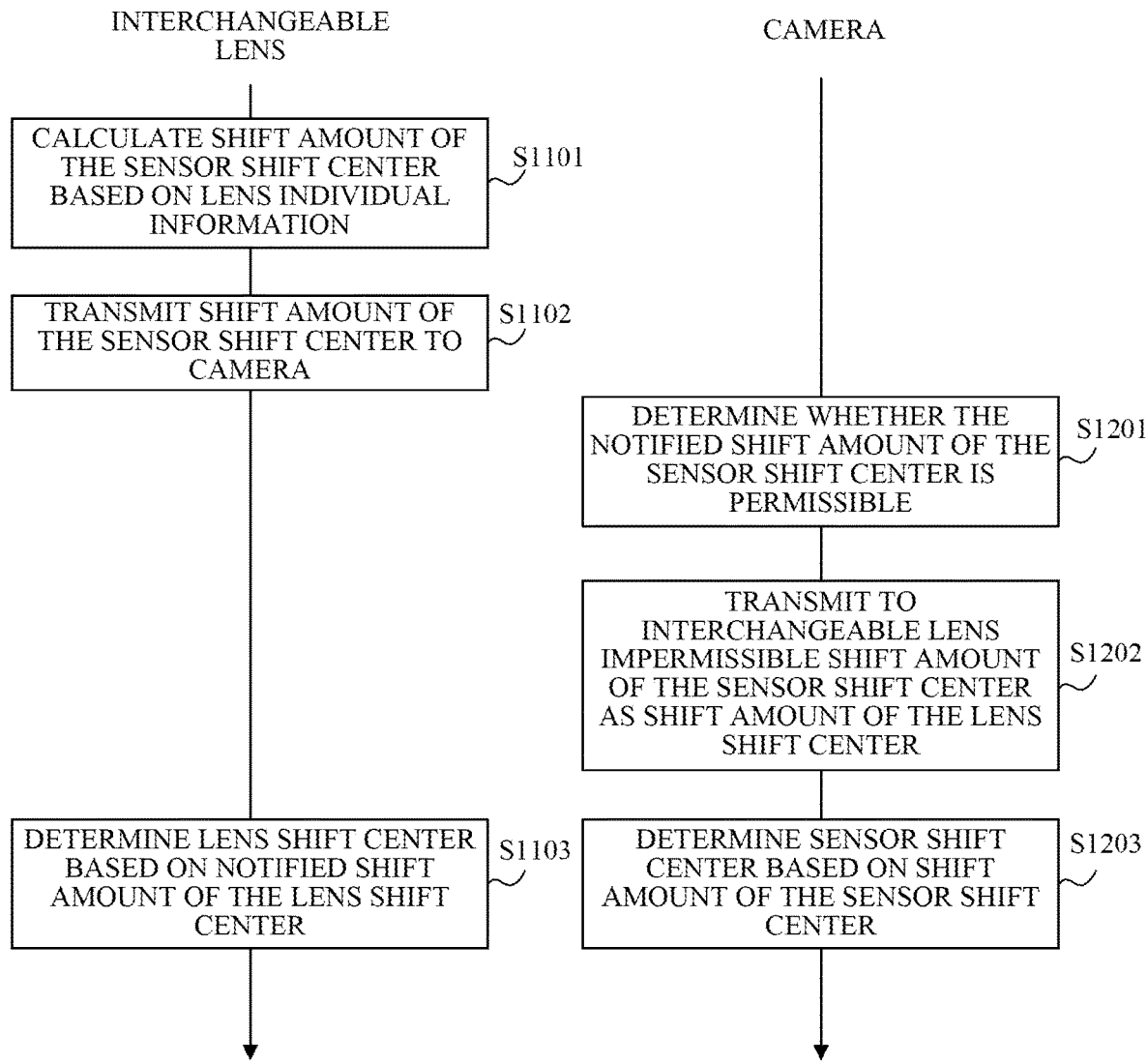
FIG. 10 is a flowchart of processing performed according to a fourth embodiment.

A flowchart of FIG. 10 describes processing performed by the camera microcomputer 102 and the lens microcomputer 226 according to the fourth embodiment. Here, the processing will be described until the camera microcomputer 102 and the lens microcomputer 226 respectively determine the lens shift center and the initial sensor shift position (referred to as a "sensor shift center" in this embodiment hereinafter).

In the step S1101, the lens microcomputer 226 sets a shift amount of the sensor shift center based on the lens individual information (image circle center information stored in the data storage unit 227) of the interchangeable lens 200.

Next, in the step S1102, the lens microcomputer 226 transmits the shift amount of the sensor shift center calculated in the step S1101 to the camera microcomputer 102.

Next, in the step S1201, the camera microcomputer 102 determines whether the shift amount of the sensor shift center received from the lens microcomputer 226 is a permissible shift amount. The permissible shift amount of the sensor shift center is a shift amount of the sensor shift center that can provide sufficient sensor IS in the sensor shiftable range. The sensor shiftable range at this time is determined by the mechanical constraints, the constraints due to electric power for shifting the image sensor 101, the constraints caused by the influence of the magnetic noise generated by shifting the image sensor 101, and the like.

Next, in the step S1202, the camera microcomputer 102 transmits the impermissible shift amount of the sensor shift center (the difference from the permissible shift amount) as a shift amount of the lens shift center to the microcomputer 226. When the shift amount of the sensor shift center is permissible, the camera microcomputer 102 transmits the shift amount of the lens shift center as 0 to the lens microcomputer 226 or does not transmit the shift amount of the lens shift center.

In the step S1103, the lens microcomputer 226 having received the shift amount of the lens shift center determines the lens shift center shifted from the origin position as the position of the image stabilization lens 204 attached to the interchangeable lens 200.

On the other hand, in the step S1203, the camera microcomputer 102 also determines a sensor shift center shifted by the permissible shift amount of the sensor shift center based on the original sensor shift center where there is no image circle shift. Then, since the shift amount of the sensor shift center impermissible for the camera 100 is allotted with the interchangeable lens 200 as the shift amount of the lens shift center, the camera 100 may shift the sensor shift center by the permissible shift amount of the sensor shift center.

Fifth Embodiment

Figure 11:
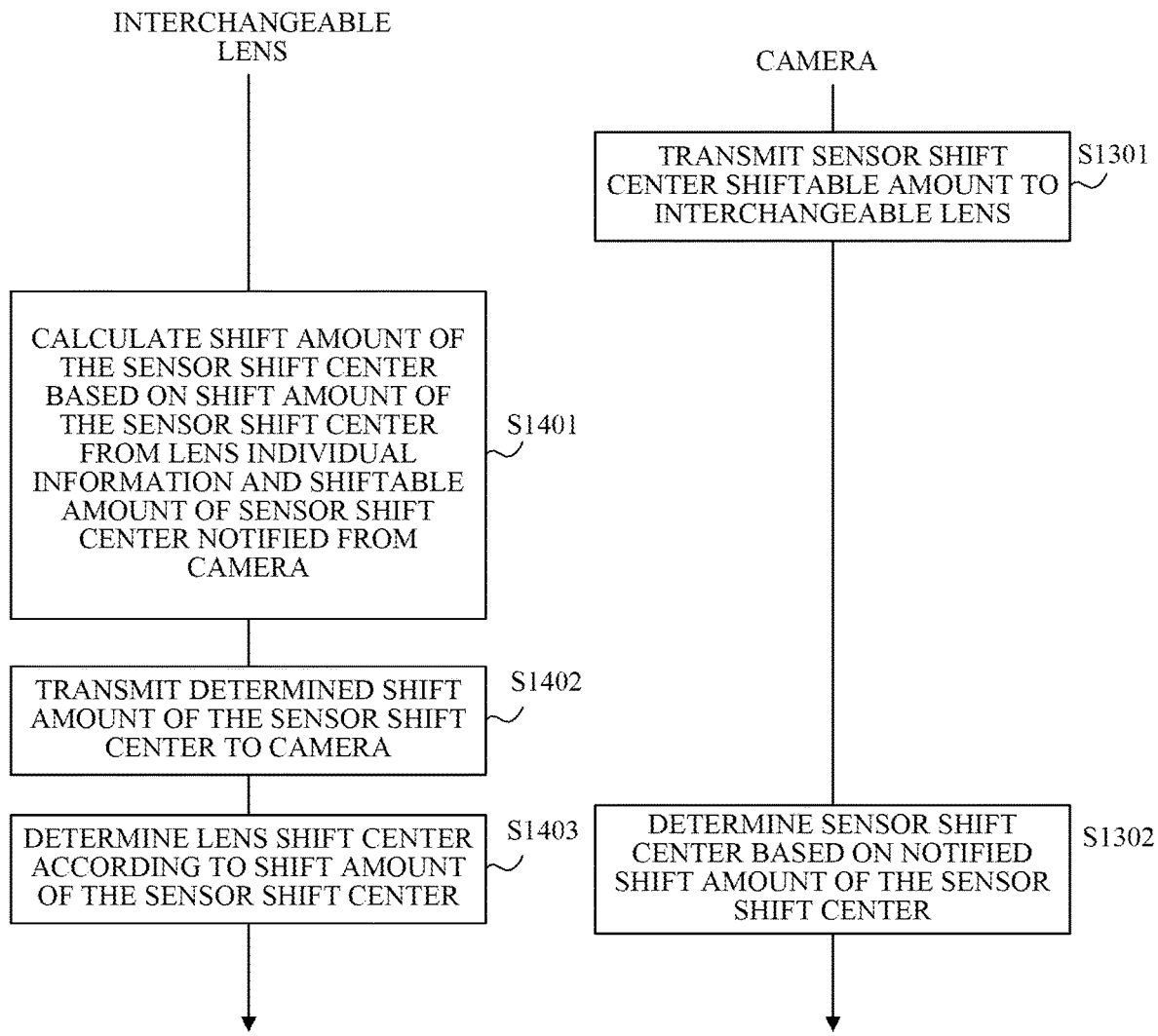
FIG. 11 is a flowchart of processing performed according to a fifth embodiment.

Referring now to a flowchart of FIG. 11, a description will be given of processing performed by the camera microcomputer 102 and processing performed by the lens microcomputer 226 according to a fifth embodiment. More specifically, this embodiment discusses processing (right side in FIG. 11) of the camera microcomputer 102 for determining the sensor shift center and processing (left side in FIG. 11) of the lens microcomputer 226 for determining the lens shift center and the sensor shift center. The configurations of the camera 100 and the interchangeable lens 200 of the fifth embodiment are the same as those of the first embodiment.

In the step S1301, the camera microcomputer 102 calculates a shiftable amount of the sensor shift center which can shift the sensor shift center, and transmits it to the lens microcomputer 226. The camera microcomputer 102 determines the shiftable amount of the sensor shift center based on the mechanical constraints, the constraints due to electric power for shifting the image sensor 101, the constraints caused by the influence of the magnetic noise generated by shifting the image sensor 101, and the like.

Next, in the step S1401, the lens microcomputer 226 calculates the shift amount of the sensor shift center based on the lens individual information. Further, the lens microcomputer 226 compares the calculated shift amount of the sensor shift center with the shiftable amount of the sensor shift center received from the camera microcomputer 102. When the shift amount of the sensor shift center is equal to or less than the shiftable amount of the sensor shift center, the shift amount of the sensor shift center is set to the determined shift amount of the sensor shift center as it is. On the other hand, when the shift amount of the sensor shift center is larger than the shiftable amount of the sensor shift center, the shiftable amount of the sensor shift center is set to the determined shift amount of the sensor shift center.

Next, in the step S1402, the lens microcomputer 226 transmits the shift amount of the sensor shift center determined in the step S1401 to the camera microcomputer 102.

Then, in the step S1403, the lens microcomputer 226 determines the lens shift center according to the shift amount of the sensor shift center determined in the step S1401. More specifically, if the shift amount of the sensor shift center is equal to or less than the shiftable amount of the sensor shift center in the step S1401, the original position of the image stabilization lens 204 is maintained. On the other hand, when the shift amount of the sensor shift center is larger than the shiftable amount of the sensor shift center in the step S1401, the lens shift center shifted from the origin position of the image stabilization lens 204 by the difference is determined.

In the step S1302, the camera microcomputer 102 determines the sensor shift center shifted by the shift amount of the sensor shift center received from the lens microcomputer 226 from the original sensor shift center where there is no image circle shift. Since the lens microcomputer 226 determines the shift amount of the sensor shift center based on the shiftable amount of the sensor center in the step S1403, the shift amount of the sensor shift center impermissible for the camera 100 is never transmitted to the camera microcomputer 102.

Sixth Embodiment

While the first embodiment describes the center position of the image circle changing in accordance with the zoom position (focal length) and the countermeasure (processing) for it, a sixth embodiment describes a variation.

Figures 12, 13A, 13B:
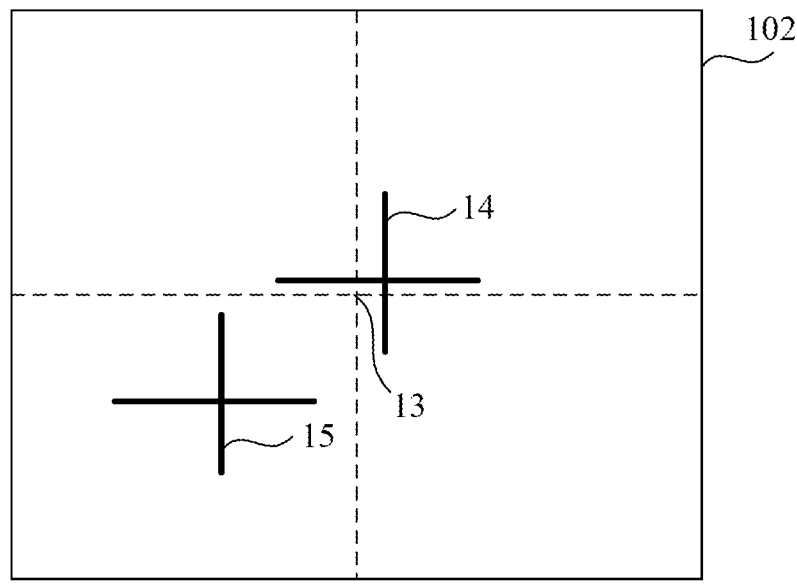
FIG. 12 explains a zoom center shift according to a sixth embodiment.
FIGS. 13A and 13B illustrate a data table of the zoom center shift amount according to the sixth embodiment.

When the imaging optical system is magnification-variable and the center position of the image sensor shifts from the optical axis 210a in the imaging optical system due to the manufacturing errors or the like, as illustrated in FIG. 12, a phenomenon called "zoom center shift" occurs in which object images 14 and 15 to be formed at a center 13 on the image sensor 101 move with a magnification variation. In other words, the center position of the image circle moves in the zooming. The object image 14 is an object image at the wide-angle end, and the object image 15 is an object image at the telephoto end. Then, due to the zoom center shift (movement of the center position of the image circle), the light amounts at the four corners of the image sensor 101 fluctuate and one of the four corners protrudes from the image circle.

This embodiment expresses the magnitude of the zoom center shift (referred to as a "zoom center shift amount" hereinafter) as the shift amount from the center of the image sensor 101 in the xy coordinate system. Since the zoom center shift amount varies according to the focal length, the zoom center shift amount corresponding to the focal length is stored in the data storage unit 227 in the interchangeable lens 200. Further, since the zoom center shift amount varies depending on the camera (or lens) orientation, the zoom center shift amount corresponding to the focal length and the camera orientation may be stored in the data storage unit 227.

Although not illustrated, when an attachment lens is attached to the interchangeable lens 200 on the object or image side, it is desirable to change the zoom center shift amount according to the magnification (optical characteristic) of the attachment lens. For example, where β is a magnification of the attachment lens, the zoom center shift amount is multiplied by β.

FIG. 13A illustrates a data table of the zoom center shift amount stored in the data storage unit 227. As described above, since the zoom center shift amount varies depending on the zoom position and the camera orientation, the data table illustrated in FIG. 13A describes the zoom center shift amount (x[1] to [n], y[1] to [n]) for each camera orientation (ANGLE[0] to [m]) and for each zoom position (ZOOM[0] to [xx]).

A zoom center shift amount Y at a zoom position x can be calculated by using a cubic polynomial expressed by the following expression (1).

$$Y = Ax^3 + Bx^2 + Cx + D \qquad (1)$$

A, B, C, and D in the expression (1) are coefficients and may be stored in the data storage unit 227 as a data table as shown in FIG. 13B. Each coefficient is prepared for each of x and y coordinates. Furthermore, each coefficient is prepared for each camera orientation. The expression (1) is merely illustrative, and may be expressed by a polynomial, such as a quartic or fifth order.

Figure 14:
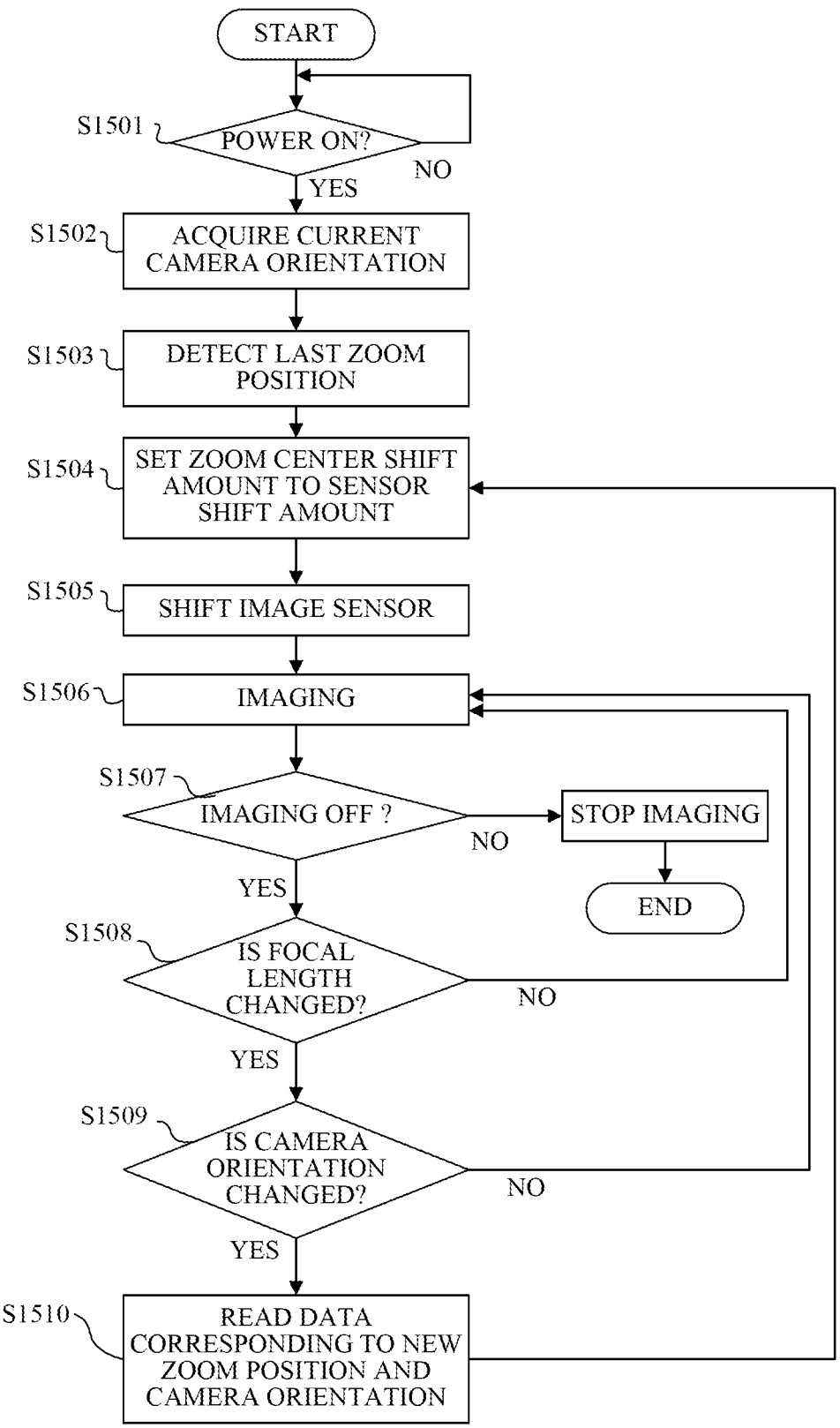
FIG. 14 is a flowchart of processing performed according to the sixth embodiment.

A flowchart of FIG. 14 illustrates processing performed by the camera microcomputer 102 and the lens microcomputer 226 according to this embodiment.

When the camera 100 is powered on in the step S1501, the camera microcomputer 102 detects the camera orientation through the orientation detecting unit 104 in the step S1502.

Next, in the step S1503, the camera microcomputer 102 requires the lens microcomputer 226 to read and transmit the zoom center shift amount (or the image circle center information) according to the current zoom position (at the last power off) from the data storage unit 227. The lens microcomputer 226 transmits the requested zoom center shift amount to the camera microcomputer 102.

In the step 1504, the camera microcomputer 102 sets the shift amount of the image sensor 101 based on the zoom center shift amount received from the lens microcomputer 226. Next, in the step 1505, the camera microcomputer 102 shifts the image sensor 101 by the shift amount set in the step S1504. Thereby, the zoom center shift is corrected.

Next, in the step 1506, the camera microcomputer 102 captures an image where the zoom center shift is corrected in accordance with the imaging instruction from the user. Next, in the step S1507, the camera microcomputer 102 determines whether an imaging stop (OFF) instruction has been issued by the user, and if not, the camera microcomputer 102 proceeds to the step S1508.

In the step 1508, the camera microcomputer 102 determines whether the zoom operation has been performed by the user or whether the focal length has been changed. If the camera microcomputer 102 determines that the zooming operation is not performed, the flow returns to the step S1506, and if it is determined that the zooming operation has been performed, the flow proceeds to the step S1509.

In the step S1509, the camera microcomputer 102 detects the camera orientation through the orientation detecting unit 104, and determines whether there has been a change from the camera orientation detected in the step S1502. If the camera microcomputer 102 determines that there is no change in the camera orientation, the flow returns to the step S1506. If it is determined that the camera orientation has changed, the flow proceeds to the step S1510.

In the step S1510, the camera microcomputer 102 requests the lens microcomputer 226 to transmit the zoom center shift amount corresponding to the new zoom position and camera orientation. In accordance with the request, the lens microcomputer 226 reads the zoom center shift amount from the data storage unit 227 and transmits it to the camera microcomputer 102. Upon receiving the zoom center shift amount, the camera microcomputer 102 returns to the step S1504 and sets the shift amount of the image sensor 101 based on the zoom center shift amount received in the step S1510.

If the user issued the imaging stop instruction in the step S1507, the camera microcomputer 102 proceeds to the step S1511 and stops imaging and then terminates this processing.

Seventh Embodiment

In this embodiment, the camera microcomputer 102 corrects the image circle shift according to the image circle diameter. In other words, the initial position of the image sensor 101 is set so that the correction residue amount can change in control for making close the center position of the image circle to the center position of the image sensor 101 according to the diameter of the image circle.

Where the image circle diameter is small (first diameter), the shiftable amount of the image sensor 101 in correcting an image blur becomes smaller than that where the image circle diameter is large (second diameter). Thus, when the image circle diameter is small, the shiftable amount may be larger by correcting the image circle shift. On the other hand, the diameter of the image circle larger than the predetermined value causes the shiftable amount of the image sensor 101 to be large, and it is not always necessary to correct the shift of the image circle.

Thus, this embodiment does not correct the image circle shift where the image circle is larger than the predetermined value, and moves the image sensor 101 so as to correct the image circle shift where the image circle is smaller than the predetermined value.

Figure 15:
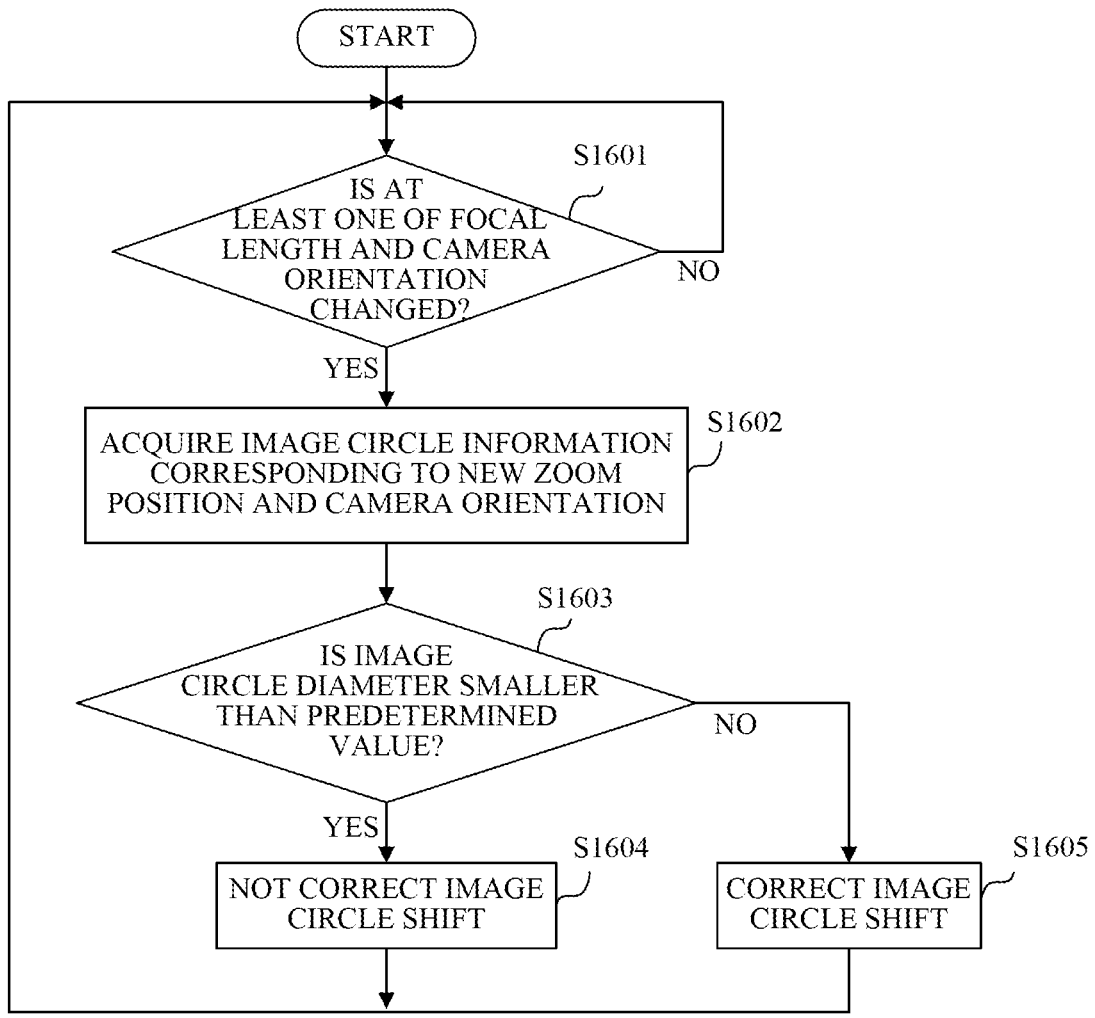
FIG. 15 is a flowchart of processing performed according to a seventh embodiment.

For example, the camera microcomputer 102 executes a program illustrated in the flowchart of FIG. 15. Assume that when this flowchart starts, the initial communication has ended between the camera 100 and the interchangeable lens apparatus 200.

In the step S1601, the camera microcomputer 102 determines whether at least one of the focal length of the imaging optical system 210 and the camera orientation has changed, and repeats the processing of the step S1601 until the change is determined. When at least one of the focal length of the imaging optical system 210 and the camera orientation changes, the camera microcomputer 102 acquires the image circle information corresponding to the current zoom position and camera orientation in the step S1602. The acquisition method is as described in the first embodiment and the like.

In the step S1603, the camera microcomputer 102 determines whether or not the image circle diameter included in the image circle information is larger than a predetermined value.

If the camera microcomputer 102 determines that the image circle diameter is larger than the predetermined value in the step S1603, the flow proceeds to the step S1604 and the camera microcomputer 102 does not change the initial position of the image sensor 101.

If the camera microcomputer 102 determines in the step S1603 that the image circle diameter is smaller than the predetermined value, the flow proceeds to the step S1605 and the camera microcomputer 102 changes the initial position of the image sensor 101 to correct the image circle shift. In other words, the camera microcomputer 102 performs control to bring the center position of the image circle corresponding to the current zoom position and camera orientation close to the center position of the image sensor 101. Thereafter, the camera microcomputer 102 returns to the step S1601.

Correcting the shift of the image circle if necessary can quickly provide the initial sensor shift position of the image sensor 101.

The correction residue amount for the center position correction may be made different between when the image circle diameter is larger than the predetermined value and when the image circle diameter is smaller than the predetermined value. For example, the correction residue amount when the image circle diameter is larger than the predetermined value may be larger than that when the image circle diameter is smaller than the predetermined value.

When the image circle shift is corrected by moving the image stabilization lens 204 based on the instruction from the lens microcomputer 226, the same control method as that for the image sensor 101 is applicable.

In each of the above embodiments, the lens microcomputer 226 transmits information on the image circle in accordance with a transmission request from the camera microcomputer 102. However, when the interchangeable lens 200 is attached to the camera 100, the lens microcomputer 226 may voluntarily transmit information on the image circle to the camera microcomputer 102.

The image circle information stored in the data storage unit 227 does not necessarily contain the size information of the image circle. Where the interchangeable lens 200 in the imaging system has a size of the image circle that does not little fluctuate and the camera microcomputer 102 can acquire the size information of the image circle from the individual number of the interchangeable lens 200, the interchangeable lens 200 may transmit only the center information of the image circle as information on the image circle.

Each of the above embodiments discusses the position information of the image circle stored in the interchangeable lens 200 as the center information of the image circle, but the position information of the image circle is not limited to this example. For example, when the image circle is elliptical, it may be information on two focal positions of an ellipse or it may be information on a plurality of representative positions on the outer circumference of the image circle.

The image circle size information may be the size information of the image circle. For example, if the image circle is a circle, the image circle size information may contain a radius, a diameter, a circumference length, or the like. When the image circle is an ellipse, it may contain the length of the major axis and the length of the minor axis, the length of either the major axis or the minor axis, the ratio of the major axis to the minor axis, and the like.

While this embodiment discusses the position information of the image circle and the size information of the image circle that are different according to the zoom position, the focus position, and the diaphragm position in the imaging optical system 210, and the orientation of the camera 100, but the embodiment according to the present invention is not limited to this example. The data storage unit 227 may store at least information on the relationship between at least one parameter of the imaging condition and the position information of the image circle that differs depending on the parameter. For example, when the position information of the image circle largely depends on the zoom position, the information stored in the data storage unit 227 may be the position information of the image circle of a constant value at the same zoom position and may be the fluctuating position information of the image circle only when the zoom position changes.

The image stabilization lens 204 in the image stabilization control may be controlled based only on the detection signal from the camera vibration detecting unit 105 or the new detection signal from the lens vibration detecting unit 228 and the detection signal from the camera vibration detecting unit 105. The image sensor 101 in the IS control may be controlled based only on the detection signal from the lens vibration detecting unit 228 or the new detection signal from the lens vibration detecting unit 228 and the detection signal from the camera vibration detecting unit 105.

The image stabilization (also referred to as an "image blur correction") in this specification means reducing a shift of the image position in the image sensor, which is caused by the vibration of the camera 100.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2017-216501, filed on Nov. 9, 2017, and 2018-205872, filed on Oct. 31, 2018, which are hereby incorporated by reference herein in their entirety.

What is claimed is:

1. An imaging apparatus, to which a lens apparatus including an optical system configured to form an image of an object is attachable, the imaging apparatus comprising:
an image sensor movable for an image stabilization; and
a control unit configured to control a movement of the image sensor,
wherein the control unit sets an origin position of the image sensor for the image stabilization by using first information on a relationship between an imaging condition and position information of an image circle of the optical system corresponding to the imaging condition, the first information being transmitted from the lens apparatus,
wherein the imaging condition has a plurality of parameters.

2. The imaging apparatus according to claim 1, wherein the plurality of parameters include at least one of a focus position of the optical system and an orientation of the lens apparatus or the imagine apparatus.

3. The imaging apparatus according to claim 1, wherein the control unit sets a movable amount of the image sensor for the image stabilization by using second information on a relationship between an imaging condition and size information of an image circle of the optical system corresponding to the imaging condition, the second information being transmitted from the lens apparatus.

4. The imaging apparatus according to claim 1, wherein the plurality of parameters include at least two of a focus position of the optical system, a zoom position of the optical system, an orientation of the lens apparatus or the imaging apparatus, and a diaphragm position of the optical system.

5. The imaging apparatus according to claim 1, wherein the control unit receives all the first information in a lump from the lens apparatus.

6. The imaging apparatus according to claim 1, wherein when the first information transmitted from the lens apparatus does not include information on a relationship between an imaging condition at the transmission and position information of the image circle of the optical system corresponding to the imaging condition at the transmission, the control unit sets the origin position by using information acquired by an interpolation calculation with the first information.

7. The imaging apparatus according to claim 1, wherein the first information transmitted from the lens apparatus includes information on a relationship between an imaging condition at the transmission and position information of the image circle of the optical system corresponding to the imaging condition at the transmission.

8. The imaging Ions apparatus according to claim 1, wherein the control unit sets the origin position by moving the image sensor so that a center of the image sensor approaches a center of the image circle of the optical system.

9. The imaging apparatus according to claim 1, wherein the control unit makes different a movement amount ratio of the image sensor and an optical element movable for setting the origin position according to a focal length of the optical system, the optical element being included in the optical system.

10. The imaging apparatus according to claim 9, wherein the control unit makes larger the movement amount ratio of the image sensor for setting the origin position when the optical system has a focal length of a first distance, than that when the optical system has a focal length of a second distance shorter than the first distance.

11. The imaging apparatus according to claim 9, wherein the control section makes different a movement amount ratio of the image sensor and the optical element according to size information of the image circle of the optical system.

12. The imaging apparatus according to claim 1, wherein the control unit makes different a movement amount ratio of the image sensor and an optical element movable for the image stabilization according to a focal length of the optical system, the optical element being included in the optical system.

13. The imaging apparatus according to claim 12, wherein the control unit makes smaller the movement amount ratio of the image sensor for the image stabilization when the optical system has a focal length of a first distance, than that when the optical system has a focal length of a second distance shorter than the first distance.

14. The imaging apparatus according to claim 1, wherein the control unit sets the origin position by using the first information received from the lens apparatus and an optical characteristic of an attachment lens when the lens apparatus is attached to the imaging apparatus via the attachment lens.

15. A control method for an imaging apparatus including an image sensor movable for an image stabilization, and to which a lens apparatus including an optical system configured to form an image of an object is attachable, the control method comprising:
causing the imaging apparatus to set an origin position of the image sensor for the image stabilization by using first information on a relationship between an imaging condition and position information of an image circle of the optical system corresponding to the imaging condition, the first information being transmitted from the lens apparatus,
wherein the imaging condition has a plurality of parameters.

16. The control method according to claim 15, wherein the plurality of parameters include at least one of a focus position of the optical system and an orientation of the lens apparatus or the imaging apparatus.

17. The control method according to claim 15, wherein the plurality of parameters include at least two of a focus position of the optical system, a zoom position of the optical system, an orientation of the lens apparatus or the imaging apparatus, and a diaphragm position of the optical system.

18. A computer-readable non-transitory storage medium for storing a control program that enables a computer in an interchangeable lens apparatus to execute a control method according to claim 15.

* * * * *